(12) United States Patent
Lev (10) Patent No.: US 9,756,908 B2
(45) Date of Patent: Sep. 12, 2017

(54) WEARABLE ELECTRONIC ORNAMENT

(71) Applicant: Hermes Innovation Ltd., Even Yehuda (IL)

(72) Inventor: Eitan Lev, Even Yehuda (IL)

(73) Assignee: Hermes Innovation Ltd., Even Yehuda (IL)

( * ) Notice: Subject to any disclaimer, the term of this patent is extended or adjusted under 35 U.S.C. 154(b) by 246 days.

(21) Appl. No.: 14/641,448

(22) Filed: Mar. 9, 2015

(65) Prior Publication Data
US 2015/0281628 A1    Oct. 1, 2015

Related U.S. Application Data

(60) Provisional application No. 61/969,848, filed on Mar. 25, 2014.

(51) Int. Cl.
| | | |
|---|---|---|
| *H04N 5/72* | (2006.01) | |
| *A44C 9/00* | (2006.01) | |
| *H04N 1/00* | (2006.01) | |
| *A44C 15/00* | (2006.01) | |

(52) U.S. Cl.
CPC ....... *A44C 9/0053* (2013.01); *H04N 1/00244* (2013.01); *H04N 1/00514* (2013.01); *A44C 15/0015* (2013.01)

(58) Field of Classification Search
CPC ........ H04N 5/64; H04N 5/655; G06F 1/1616; B60R 2011/0017; B60R 11/0211
USPC .......................................................... 348/838
See application file for complete search history.

(56) References Cited

U.S. PATENT DOCUMENTS 7,751,285 B1 *  7/2010  Cain .................... G04G 9/0017
368/10

* cited by examiner

*Primary Examiner* — William C Vaughn, Jr.
*Assistant Examiner* — Daniel Tekle
(74) *Attorney, Agent, or Firm* — The Law Office of Joseph L. Felber (57) ABSTRACT

A wearable electronic ornament has a manually-changeable skin and an electronic screen exhibiting a visual. When a user replaces the skin, the visual automatically changes to match the skin. Visuals are received from a store on the skin, a mobile device of the user, or a remote server, or can be generated by a camera of the mobile device.

10 Claims, 11 Drawing Sheets

WEARABLE ELECTRONIC ORNAMENT

CROSS REFERENCE TO RELATED APPLICATIONS

This application claims the benefits of U.S. provisional patent application No. 61/969,848 filed on Mar. 25, 2014, which is incorporated by reference in its entirety as if set forth herein.

BACKGROUND OF THE INVENTION

Field of the Invention

The present invention relates to wearable ornaments, and in particular to wearable electronic ornaments that display changeable visuals.

Description of Related Art

Wearable ornaments are commonplace, in forms such as pendants, necklaces, earrings, rings, bracelets, brochettes, watches and the like. Some recent developments have introduced electronic wearable ornaments that include an electronic display exhibiting a changeable or changing image, as described, for example, in U.S. Pat. Nos. 8,279,609 and 7,312,773, and US patent application publication 2012/0086832.

Wearable ornaments are adapted to personal taste, clothing, mood and special events. The incorporation of a changeable display allows, on the one hand, producing eye-catching or informative effects, and, on the other hand, enhancing the versatility of adapting ornaments to tastes, circumstances and social motives.

It could be advantageous to assist users of an electronic wearable ornaments with adapting the appearance of their ornaments to personal and changing tastes, circumstances and social motives. This goal is met by the present disclosure.

BRIEF SUMMARY OF THE INVENTION

Definitions

By "wearable electronic ornament", also abbreviated "wearable ornament" or "ornament", is meant herein a personal article attachable to a person's body or clothing. Exemplary forms of ornaments include, but are not limited to, pendants, necklaces, earrings, rings, bracelets, brochettes and watches.

By "visual" is meant herein a changeable still or video image. A "video" means herein any motion picture, that spontaneously changes in time, including photographed clips, or artificially-animated clips. A visual is intended to create an aesthetic, eye-catching or informational effect that enhances the overall impression of an ornament. Optionally, a visual may also include an audio track, that is played when the visual is exhibited, and/or text used for information or messages.

By "electronic display" or "display", is meant herein a visible part of an ornament, that exhibits a visual. Usually, the display is positioned at the front face of an ornament worn by a person. "Wearing" an ornament by a person means herein carrying the ornament by the person so that the ornament is attached to the person's body part or clothing, and its display is visible to others.

By "personal computing device" of a user is meant herein a computing device used solely or primarily by the user, so that the user can select programs to be installed on the computing device for his or her use. Non-limiting examples of a personal computing device include stationary and portable personal computers, mobile telephones, and tablets.

Summary

The present disclosure seeks to provide systems and functionalities for assisting users of wearable ornaments with obtaining and adapting visuals to be exhibited on their ornaments.

In its broadest sense, the present disclosure teaches a cooperation between a wearable ornament and a personal computing device that communicate with each other via a short-range communication link. The personal computing device assists the user in creating, obtaining and/or adapting a visual that matches a detachable skin.

There is thus provided, according to preferred embodiments of the present invention, a method, executed by at least one processor, for matching, on a wearable ornament, a logically-changeable visual with a physically-changeable skin, the method including: identifying a current skin that is currently attached to the wearable ornament; sending to a store of visuals, that is hosted on a remote server, an identifier of the current skin; retrieving a selected visual in response to the identifier of the current skin; and providing the selected visual for exhibition on a display of the wearable ornament.

The method may execute the retrieval of the selected visual by receiving, from the store of visuals, a plurality of visuals chosen by the server, in response to the identifier of the current skin, to match the current skin; and getting a user input that selects the selected visual from the plurality of the received visuals. Alternatively, the retrieval may be executed by receiving, from the store, a single visual chosen by the store, in response to the identifier of the current skin, to match the current skin, in which case, such a single visual may change to another visual, in a subsequent retrieval for the same current skin.

Furthermore, the selected visual may includes a still version and a video version, and the method then may detect whether the wearable ornament is in motion or at rest, and if the wearable ornament is in motion, then exhibit the video version, or if the wearable ornament is at rest, then exhibit the still version.

Also, the selected visual may include a video track and an audio track, and the method may then exhibit the video track on the wearable ornament, synchronously with playing the audio track on a mobile device that communicates with the wearable ornament that exhibits the video.

There is also provided a system that includes a wearable ornament and mobile device selectably communicating with the wearable ornament. The wearable ornament includes a main unit that includes a display for exhibiting visuals and a changeable current skin attached to the main unit. The mobile device is configured to identify to a remote server the current skin attached to the main unit, retrieve a selected visual that matches the current skin, and provide the selected visual to the main unit of the wearable ornament for exhibition on the display of the main unit.

The mobile device may be operable to retrieve the selected visual by being configured to receive, from the server, a plurality of visuals chosen by the server to match the current skin, and getting a user input that selects the selected visual from the plurality of the received visuals. Alternatively, the mobile device may be operable to retrieve the selected visual by being configured to receive, from the server, a single visual chosen by the server to match the current skin, in which case the single visual received from the store may change to another visual in a subsequent retrieval operation for the same current skin.

Furthermore, the selected visual may include a still version and a video version, and the system may then detect whether the wearable ornament is in motion or at rest, and if the wearable ornament is in motion, then exhibit the video version, or if the wearable ornament is at rest, then exhibit the still version.

Also, the selected visual may include a video track and an audio track, and then the system may be further operative to play the audio track on the mobile device synchronously with exhibiting the video track on the wearable ornament.

BRIEF DESCRIPTION OF SEVERAL VIEWS OF THE DRAWINGS

The present invention will be understood and appreciated more fully from the following detailed description, taken in conjunction with the drawings in which:

FIGS. 2A-2K are block diagrams and schematic illustrations that add detail and illustrate views of exemplary wearable ornaments.

DETAILED DESCRIPTION OF PREFERRED EMBODIMENTS OF THE INVENTION

System Layout

Figure 1:
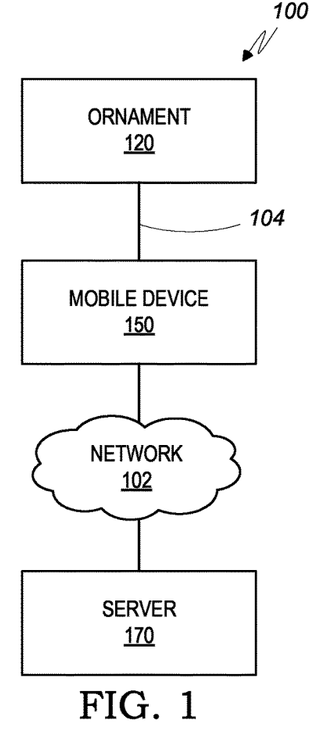
FIG. 1 is a block diagram of a system that includes a wearable ornament.

Reference is made to FIG. 1 that depicts system 100 according to a preferred embodiment of the present invention. Wearable ornament 120 communicates with mobile device 150 via wireless link 104. Wireless link 104 may be a Bluetooth link, infrared link, and/or be based on image processing of a picture of wearable ornament 120 taken by a camera that forms part of mobile device 150. Mobile device 150 connects with server 170 via network 102, which is a public network such as the Internet and/or a mobile communication network. Mobile device 150 determines the visual to be displayed on wearable ornament 120, which visual is optionally obtained from server 170, from a memory of mobile device 150, or from a camera of mobile device 150.

The Wearable Ornament

Figure 2:
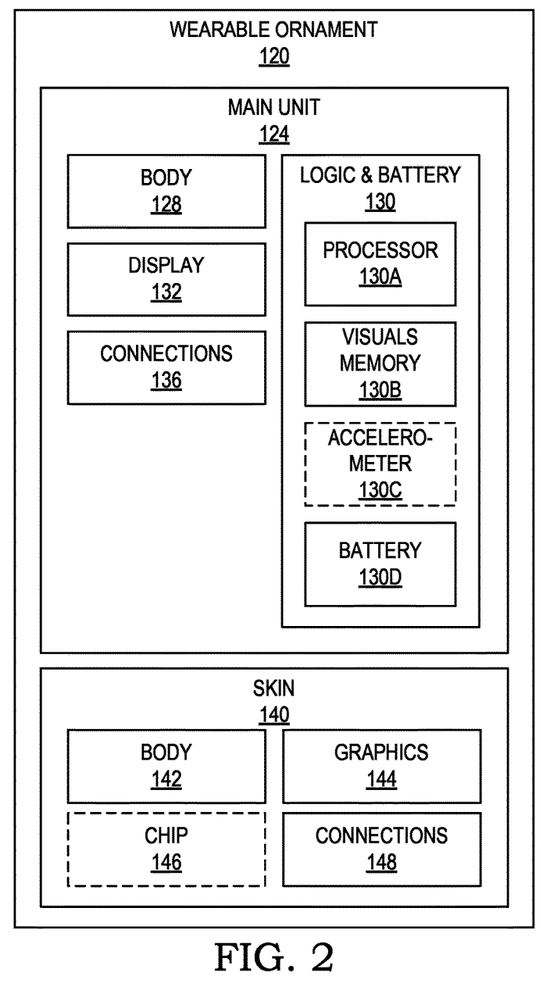
FIG. 2 is a block diagram of a wearable ornament.
Figure 2A:
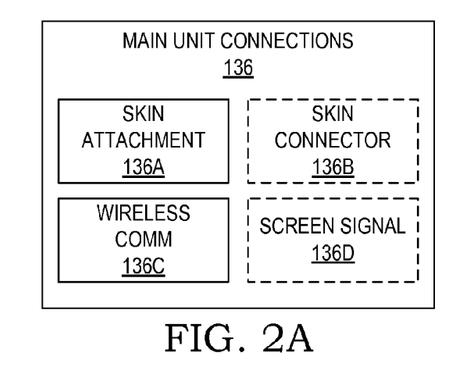
Figure 2B:
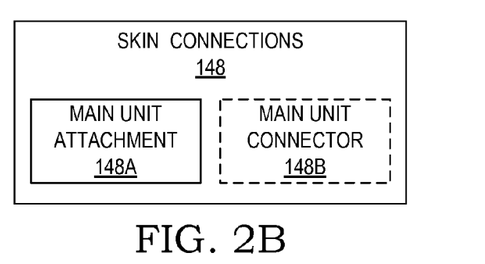
Figure 2C:
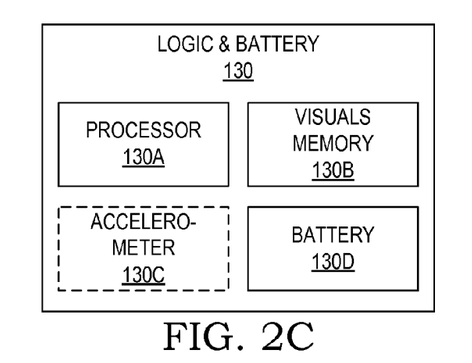
Figure 2D:
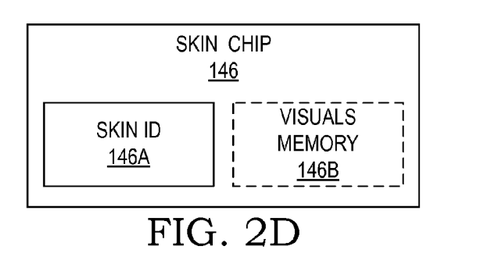

FIG. 2 schematically describes the parts of wearable ornament 120 of FIG. 1. Wearable ornament 120 includes main unit 124 and a manually-changeable skin 140 attached to it. Main unit 124 includes a body 128 that physically accommodates display 132 on its front face, for displaying a selected visual; logic and battery 130 that determine the selected visual and cause it to be displayed, and whose parts 130A-130D will be described below with reference to FIG. 2C; and main unit connections 136 that include physical attachments, electrical contacts for charging the battery included in logic and battery 130, and/or wired/wireless data interfaces for connecting with skin 140 and mobile device 150.

Skin 140 includes a thin body 142 that has graphics 144 on its face, including black & white and/or color backgrounds, patterns and/or images, as part of the overall aesthetic appearance of wearable ornament 120. Graphics 144 includes colors, images and/or patterns that grant skin 140 and wearable ornament 120 a desired aesthetic appearance. Skin 140 also optionally accommodates skin chip 146, for connecting with main unit 124 via skin connections 148.

FIGS. 2A-2D add detail to some parts of FIG. 2. Main unit connections 136 include skin attachment 136A that physically connects main unit 124 with skin 140. Skin connector 136B is optionally included for electrically connecting and logically communicating with skin chip 146, if such chip is included within skin 140. Wireless communication 136C provides a wireless link, such as a Bluetooth link, for communicating with mobile device 150. Screen signal 136D is an option to display a code, such as a bar code or QR code, that relays information, such as personal contact details, so that mobile devices of others may read and interpret the code. Skin connections 148 include main unit attachment 148A that physically connects skin 140 with main unit 124, and optionally main unit connector 148B that provides electrical and logical connections between skin chip 146 and main unit 124. Logic and battery 130 of main unit 124 include processor 130A that is programmed to execute the communication, processing and display roles of main unit 124; visuals memory 130B that includes a digital representation of the visual currently exhibited by main unit 124, and optionally other visuals that are in standby and can be quickly recalled and exhibited; accelerometer 130C is optionally included, for detecting the orientation of the wearable ornament 120 and/or determining whether the ornament is at rest or in motion, which is optionally used for affecting power-saving options, selection of the visual to be displayed, or the rhythm of presenting a video; battery 130D energizes processor 130A, display 132 and skin chip 146. Optional skin chip 146 is preferably a passive circuit that accommodates skin identifier 146A that uniquely identifies skin 140 so that mobile device 150 and/or server 170 can match one or more visuals to the skin, and a visuals memory 146B that optionally provides one or more visuals that are built into the skin and become available to the wearable ornament 120 upon a specific skin 140 is attached to it.

Figure 2E:
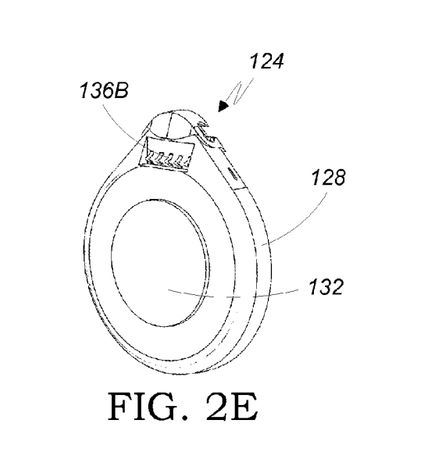
Figure 2F:
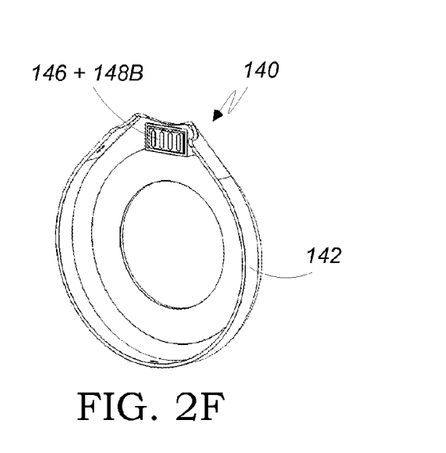
Figure 2G:
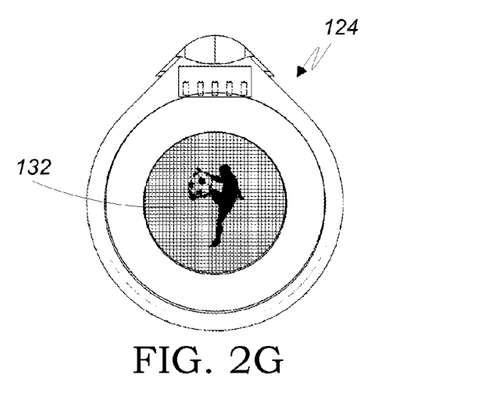
Figure 2H:
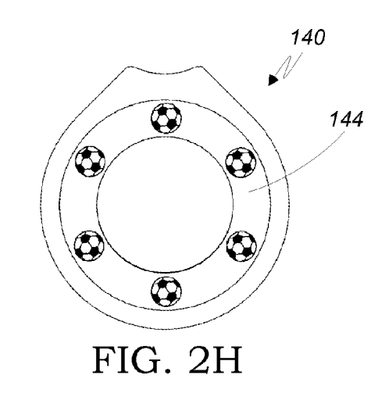
Figure 2K:
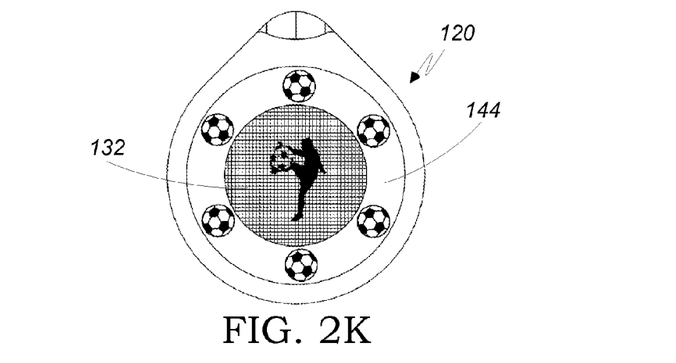

FIGS. 2E-2H and 2K illustrate various views of an exemplary embodiment of wearable ornament 120 and its parts. FIG. 2E shows a perspective view of main unit 124, emphasizing body 128, display 132 and skin connector 136B. FIG. 2F shows an inner view of skin 140, emphasizing body 142 and an integrated circuit that includes both skin chip 146 and main unit connector 148B. FIG. 2H demonstrates skin 140 having graphics 144 that features colors, illustrations, patterns and/or images. FIG. 2G demonstrates a visual shown on display 132 of main unit 124, which has been matched, according to the teachings of the present disclosure, to graphics 144 of skin 140. FIG. 2K demonstrates the final appearance of wearable ornament 120, that exhibits both matching graphics 144 and the visual displayed on display 132.

Figure 3:
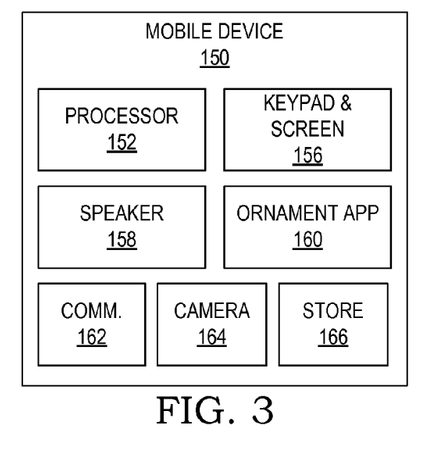
FIG. 3 is a block diagram that schematically depicts a mobile device that includes an ornament app.

FIG. 3 schematically depicts a preferred embodiment of mobile device 150 of FIG. 1. Processor 152 is programmed, by the code of ornament app 160, to execute the processing, communication and exhibition operations associated with the roles of mobile device 150 as depicted throughout the present disclosure, as well as other, customary functionalities of mobile device 150, such as telephony, games, etc., that are not covered by the present disclosure. Keypad and screen 156 are user-interface components of mobile device 150, used by the user for triggering actions and making selections as described in the present disclosure, as well as for other functionalities not covered herein. Speaker 158 is optionally available for playing a sound track in sync with a visual displayed on display 132 of wearable ornament 120. Communication component 162 includes hardware and firmware for communication between mobile device 150 and wearable ornament 120 (e.g. using Bluetooth) on the one hand, and between mobile device 150 and server 170 (e.g. using a public network) on the other hand. Camera 164 has, within the context of the present disclosure, several optional roles: (a) it may take a picture of skin 140 to identify the skin by mobile device 150 or by server 170; (b) it may take a picture of display 132 of mobile device 150 to read coded information that identifies the current visual or the user of wearable ornament 120; or (c) it may conventionally take a picture or video, that will be further processed by mobile device 150 and/or server 170, to produce another visual to be displayed by wearable ornament 120. Ornament app 160 includes program code to execute on processor 152 to provide the functionalities described above. Mobile device 150 may also include mobile device store 166, for storing visuals 190 similar to the visuals included in server store 180 of server 170 (FIG. 4 below).

Figure 4:
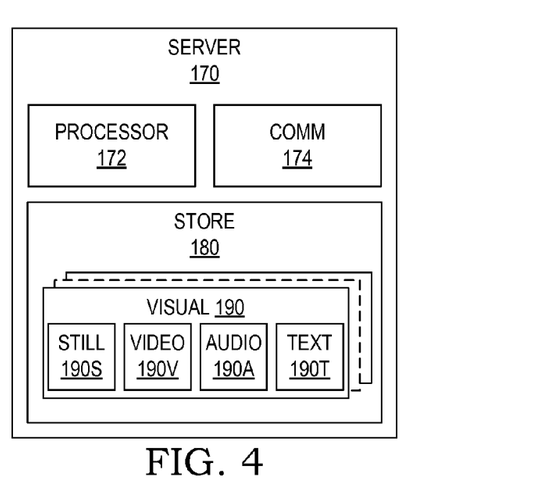
FIG. 4 is a block diagram that schematically depicts a server that stores contents for wearable ornaments.

FIG. 4 schematically depicts server 170, according to a preferred embodiment of the present invention. Processor 172 is programmed to execute all the processing and communication roles of the server described in the present disclosure. Server communication component 174 manages the communication between server 170 and mobile device 150 via network 102. Server store 180 is a storage device that includes a database of visuals, each visual 190 including a still image 190S and/or video track 190V adapted to be displayed on display 132 of wearable ornament 120, and optionally also an audio track 190A, that is preferably adapted for being played by speaker 158 of mobile device 150 synchronously with the corresponding video track 190V being played on display 132 of wearable ornament 120. Visual 190 may also include text 190T, to be displayed on display 132, or to be sent to mobile device 150 and used for informational and/or social purposes, such as informing the user's friends of the visual currently exhibited by the user's ornament.

Basic Operation Involving a Server

Figure 6:
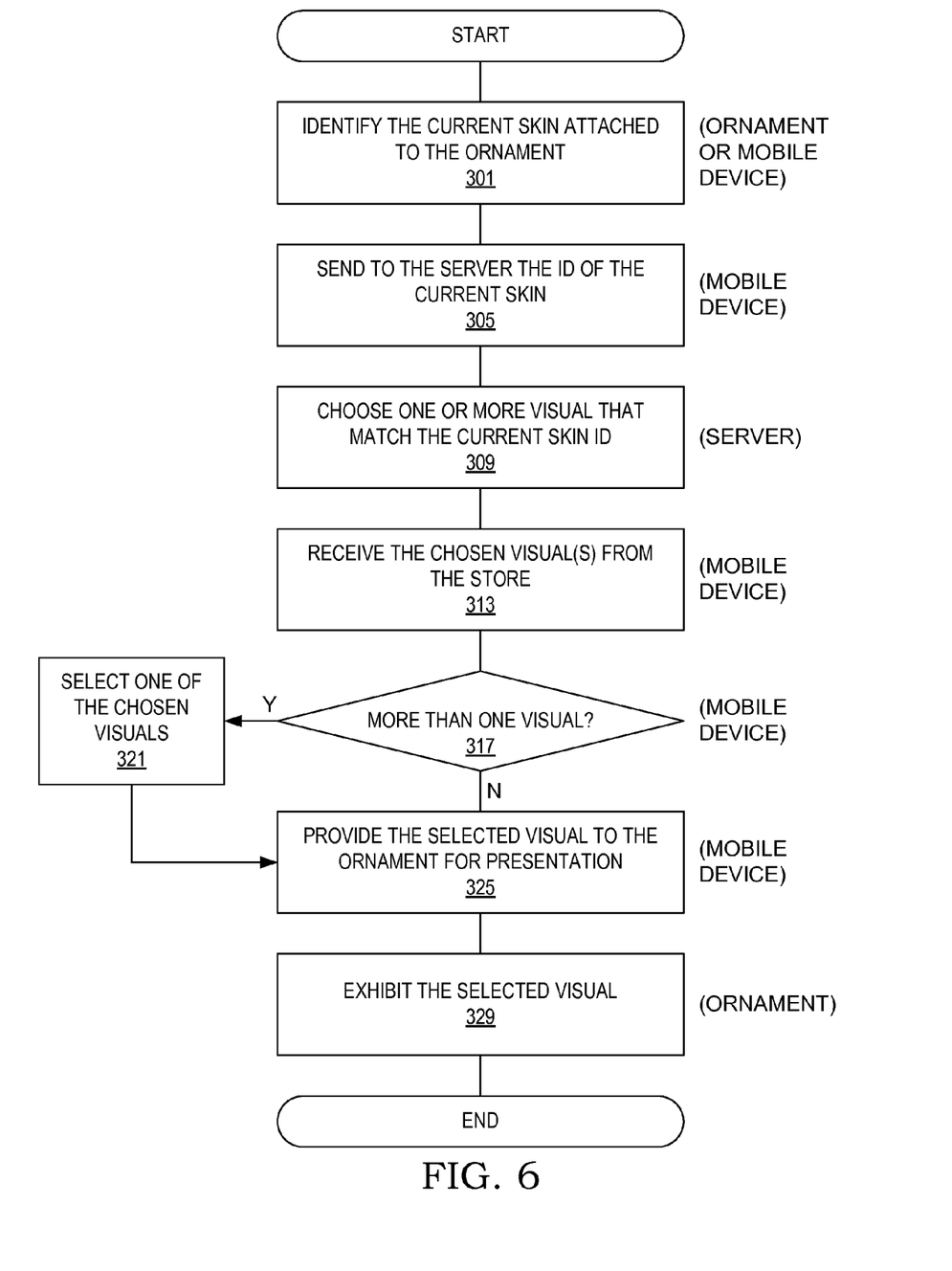
FIG. 6 is a flowchart that schematically describes basic operation.

FIG. 6 schematically describes the basic operation of a preferred embodiment of the present invention. In step 301, the identifier of the current skin attached to main unit 124 is identified, either by processor 130A of main unit 124 retrieving the skin identifier from the skin identifier 146A registered in skin chip 146, or by camera 164 of mobile device 150 taking a picture of the current skin. In the case of a picture, the taken skin image will be further processed, by either processor 152 of mobile device 150 or by processor 172 of server 170, to determine the skin identifier. In step 305, either the skin identifier or the taken picture is sent by mobile device 150 to server 170. In step 309, the server chooses one or more visuals 190 from server store 180 that match the skin identifier. The one or more visuals may be chosen according to a previously-prepared lookup table, that lists, for each skin identifier, matching visuals. The lookup table is possibly prepared according to topical and aesthetic considerations, by human observers that apply personal judgment, intuition and taste; building such a lookup table may also be performed or assisted by machine intelligence, using methods that extend beyond the scope of the present disclosure.

In step 313, mobile device 150 receives from server 170 the one or more visuals selected by the server in step 309. In case of more than one visual, step 317 diverts to step 321, which prompts the user to select the visual to be displayed. In step 325, the selected visual is provided by mobile device 150 to wearable ornament 120, which is then exhibited by step 329 on the display 132 of wearable ornament 120. In some embodiments, step 329 also includes playing an audio track 190A, that is part of the selected visual 190, on the speaker 158 of mobile device 150.

Basic Operation with an Autonomous Mobile Device

In some embodiments or instances, the selection and supply of visuals can be made autonomously by a mobile device, without involving a server.

Figure 7:
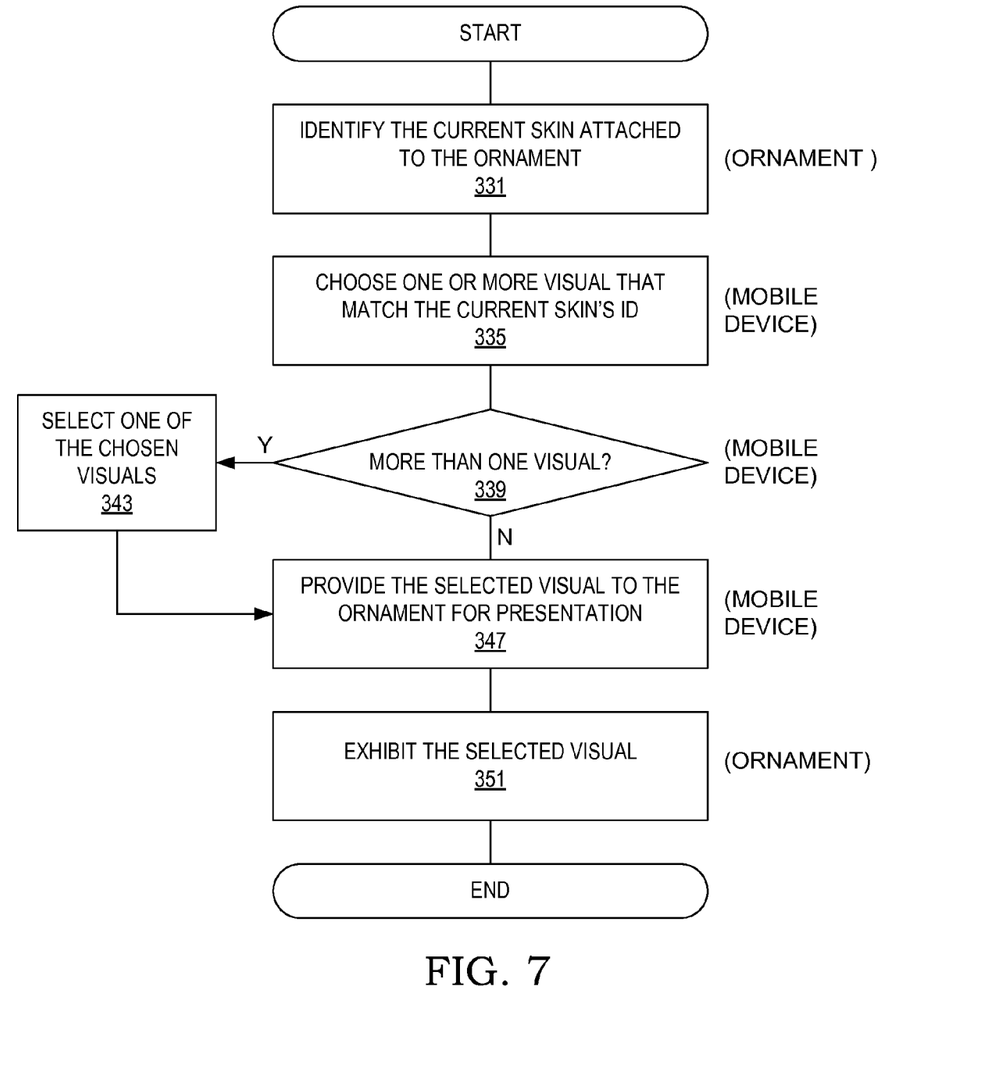
FIG. 7 is a flowchart that schematically describes operation of an embodiment.

FIG. 7 schematically describes an embodiment that involves only an ornament and a mobile device. Is step 331, the ID of the current skin attached to main unit 124 is identified, either by processor 130A of main unit 124 retrieving the skin identifier from the skin identifier 146A registered in skin chip 146, or by camera 164 of mobile device 150 taking a picture of the current skin. In the case of a picture, the taken skin image is further processed, by processor 152 of mobile device 150, to determine the skin identifier. In step 335, the mobile device chooses one or more visuals included in mobile device store 166, that match the skin identifier. The one or more skins may be chosen according to a previously-prepared lookup table, that lists, for each skin identifier, matching visuals. The lookup table is possibly prepared according to topical and aesthetic considerations, by human observers that apply personal judgment, intuition and taste; building such a lookup table may also be performed or assisted by machine intelligence, using methods that extend beyond the scope of the present disclosure. In case of more than one visual, step 339 diverts to step 343, which prompts the user to select the selected visual to be displayed. In step 347, the selected visual is provided by mobile device 150 to wearable ornament 120, which is then exhibited by step 351 on the display 132 of wearable ornament 120. In some embodiments, step 351 also includes playing an audio track, that is part of the selected visual, on the speaker 158 of mobile device 150.

Basic Operation with Skin-Resident Visuals

An ornament may have an operation mode where the displayed visual is retrieved from visuals memory 146B (FIG. 2N) of the currently-attached skin. Such visuals may be the only visuals associated with the skin, or may serve as default visuals, until the user decides to obtain an alternative matching visual from the mobile device 150 or server 170.

Figure 8:
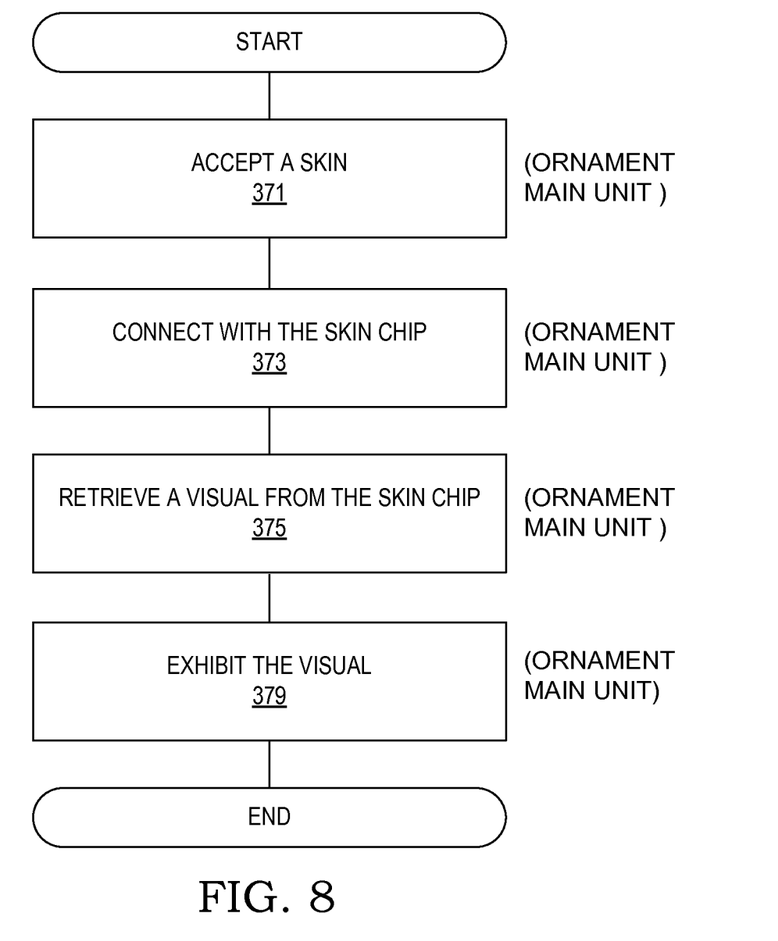
FIG. 8 is a flowchart that schematically describes a process according to a preferred embodiment of the present invention.

FIG. 8 starts in step 371, where a skin 140 is attached to main unit 124. Under the current scenario, skin 140 includes a skin chip 146, that further includes visuals memory 146B. Thus, in step 373, the main unit 124 connects with skin chip 146 via main unit connections 136 and skin connections 148, and in step 375, the main unit 124 retrieves from visuals memory 146B a visual, which is further exhibited, in step 379, on display 132.

It will be noted that, in the general case (see visual 190 of FIG. 4), a visual may include a still image, a video track and optionally also an audio track to be played on a mobile device, such an audio track will preferably be sent for playback from visuals memory 146B via wearable ornament 120 to mobile device 150. It will also be noted the visuals memory 146B of skin chip 146 may store a plurality of visuals, allowing the user to use his mobile device 150 for selecting one of the plurality of visuals for being exhibited on display 132.

Group Operation

Members of a group, such as a social group, a political party or fans of a certain celebrity, often wish to identify themselves with the group by exhibiting visuals, such as buttons, banners etc. In an embodiment of the present innovation, such members of a group acquire a skin related to the group, attach the skin to their main unit, and then automatically exhibit a group-related visual on their wearable ornament 120. In groups having a group leader, the group leader may use a group leader terminal in order to simultaneously update the visuals of all group members. It will be noted, that in the context of the present discussion, a "group member" is a user that has selected to attach the respective group skin to his or her main unit.

Figure 5:
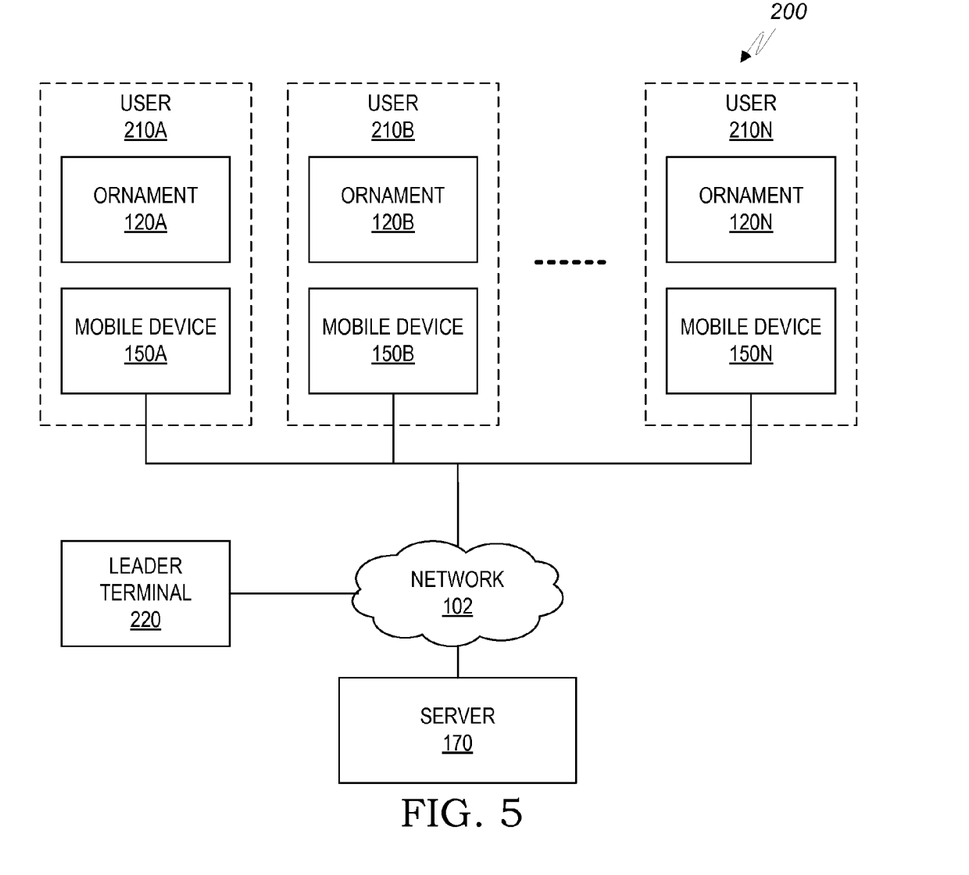
FIG. 5 is a block diagram that schematically depicts a group system.

FIG. 5 schematically depicts a group system 200, used by a plurality of users 210A . . . 210N, each user having a respective wearable ornament 120A . . . 120N and a respective mobile device 150A . . . 150N. All mobile devices include a group skin having the same skin identifier, and, as a consequence, are assigned the same visual by server 170, which visual may be determined and intermittently updated by the group leader via leader terminal 220, which is any computing device that can be used by a group leader to communicate with server 170, such as a personal computer, or a mobile device. Thus, preferably, in the group scenario, at any moment there is single visual that is considered a match for the group skin, but this visual may be intermittently updated by the group leader via leader terminal 220. It will also be noted, that a visual 190 (FIG. 4) may include a still image 190S, a video track 190V, both for display on display 132, an audio track 190A, preferably for playback on speaker 158 of mobile device 150, in sync with the video playback on display 132 of wearable ornament 120, and optionally also text 190T, to be displayed on display 132, or to be sent to mobile device 150 and used for informational and/or social purposes, such as informing the user's friends of the visual currently exhibited by the user's ornament. It will be noted that often a group leader will wear one of the group wearable ornaments, and his or her wearable ornament will exhibit the same visual, that will change in sync with the other group members. It will also be noted, that a group may count just the leader and another member, such as in the case of a couple that likes the idea of having the same visual exhibited and changing simultaneously on their personal wearable ornaments.

Figure 9:
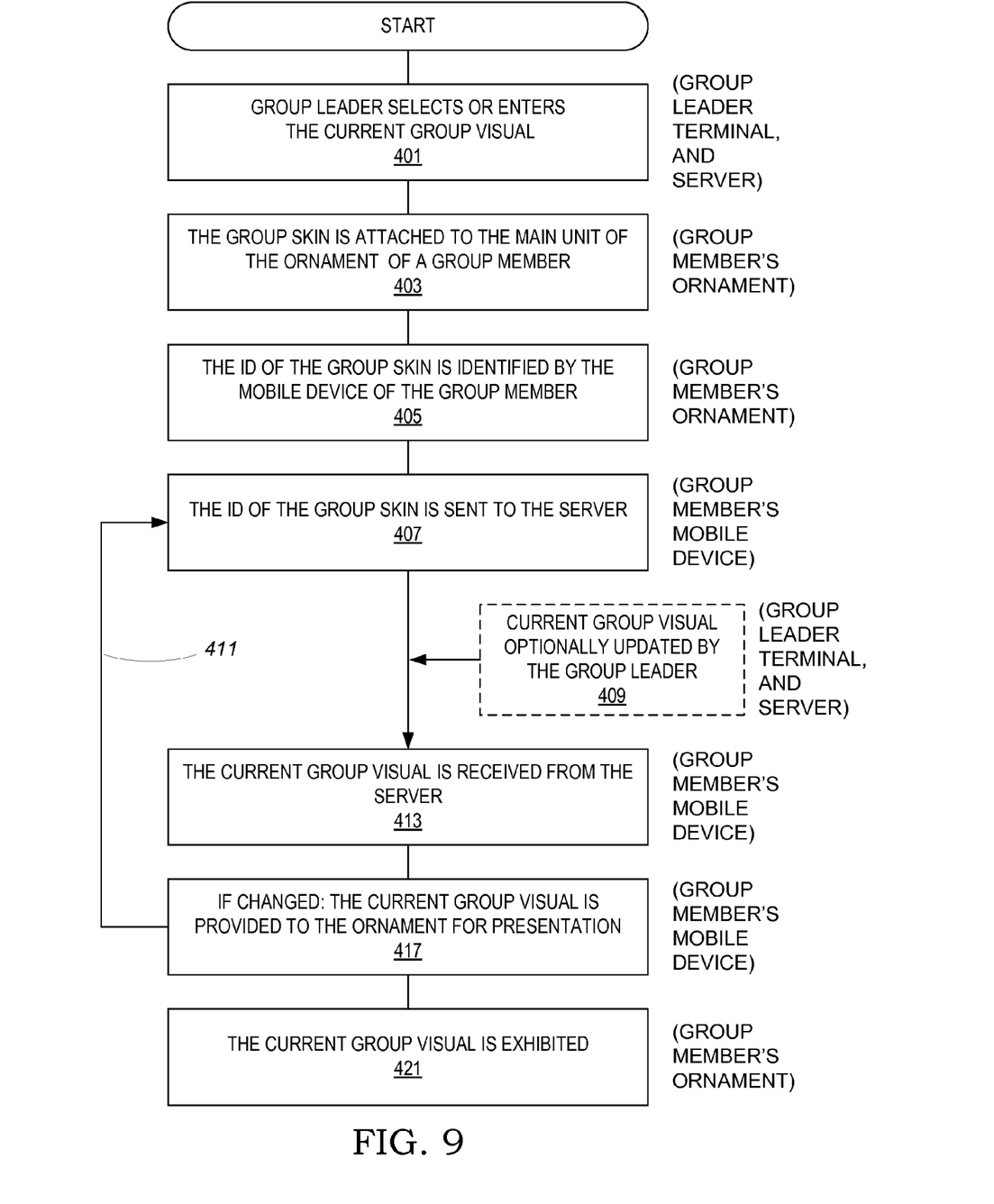
FIGS. 9 and 9A are flowcharts that schematically describe processes according to a preferred embodiment of the present invention.

FIG. 9 depicts a process of maintaining the visuals exhibited on ornaments 120A-N of FIG. 5. It is presumed that identical skins (the group skin) are to be attached to the main body of all ornaments of the group members, and FIG. 9 describes the process experienced by a representative ornament, that is any of the ornaments 120A-N. In step 401, leader terminal 220 is used by the leader of the group for entering a selected visual, or selecting a visual from a previously-entered collection of visuals; the selected visual (the current group visual) is entered or identified to the server 170, and is the visual that server 170 will match to the group skin identifier. In step 403, the group skin is attached, by the group member, to the main body of his or her ornament. In step 405 the group skin identifier is identified by the respective mobile device of the group member, similarly to step 301 of FIG. 6. In step 407, the group skin identifier is sent by the mobile device to server 170. In step 413, the mobile device receives from the server the current group visual, that currently matches the group skin identifier. If the current group visual has changed from the previous group visual, then in step 417 the current group visual is provided to the ornament for presentation, and in step 421 the current visual is actually presented. If video and audio tracks are included with the current visual, then the audio track is played by the mobile device in sync with the video track being exhibited on the display 132 of wearable ornament 120. Then, loop 411, continuously or intermittently, is used for rechecking the current group visual selected by the group leader, and for updating the visual exhibited on the ornament, upon the leader, via step 409, updating the current group visual.

Sometimes it is desirable to accurately synchronize the visuals exhibited by the ornaments of the group members, for example, in a meeting of the group, and especially when the current group visual includes a sound track played by the respective mobile devices. Ideally, the process of FIG. 9 synchronizes the exhibition of content, since all the group ornaments respond to changes made centrally in step 409 by the group leader via leader terminal 220. However, in practice, both the delay caused by loop 411 and the latency of the ornament-mobile device and mobile-device-server communication, may cause noticeable difference between the exhibition of visuals by different ornaments within the same group.

Figure 9A:
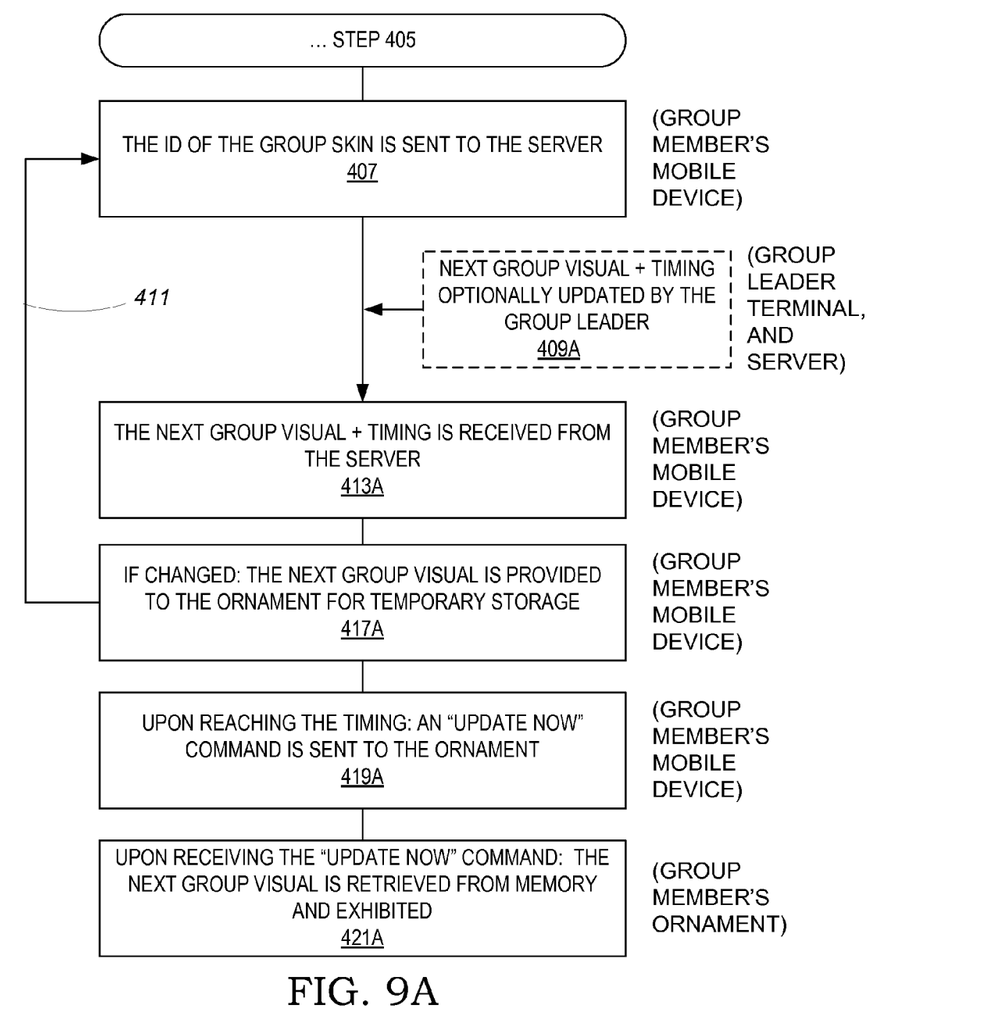

FIG. 9A describes a process, that is similar to that of FIG. 9, but is adapted to accurately synchronize the exhibition of the current visual among the ornaments of the group. Steps 401-405 are as described above with reference to FIG. 9. In step 409A, the group leader terminal attaches to the next group visual also a timing, e.g. a specific hour, that is, for example, 30 seconds ahead of the current time, in a format such as 10:03:44. Then, in step 413A the mobile device receives the next group visual+timing from the server, and, in step 417A, the next group visual is temporarily stored in the visuals memory 130B. In the embodiment of FIG. 9A, it is presumed that mobile device 150 has an accurate real-time clock, while wearable ornament 120 has no such clock; accordingly, in step 419A it is the mobile device 150 that detects, via its real-time clock, that the specified timing (such as 10:03:44) is reached, and sends to wearable ornament 120 a short signal that means "UPDATE NOW". In step 421A the "UPDATE NOW" signal is received and interpreted by wearable ornament 120, which causes the temporarily-stored next group visual to be exhibited and become the current group visual. The loop 411 is kept safely below the exemplary 30 seconds delay, for example repeated each 10 seconds, which ensures that all group ornaments will switch at once to exhibiting a new visual. It will be noted that if processor 130A of wearable ornament 120 includes an accurate real-time clock, then step 417A can send the next group visual and the timing to the ornament, step 419A can be dropped and step 421A is then triggered by the ornament's real-time clock reaching the visual switching timing.

Miscellaneous Operations and Features

Figure 10:
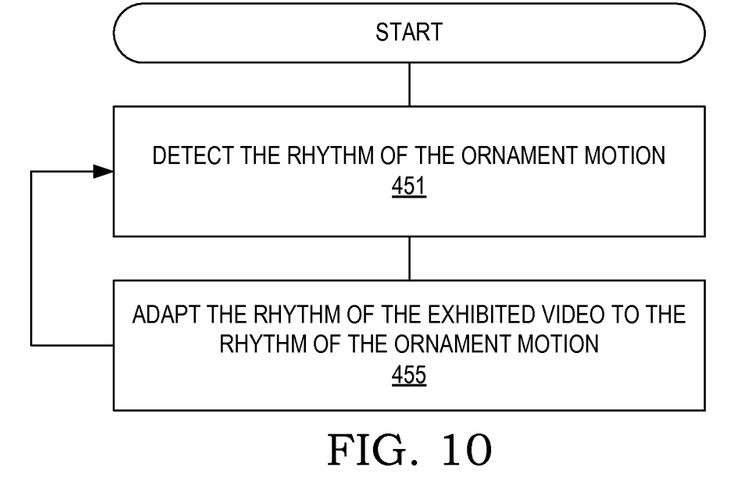
FIG. 10 is a flowchart that describes an optional mode of operation.

FIG. 10 describes an optional mode of operation, wherein accelerometer 130C (FIG. 2M) of wearable ornament 120 is used, in step 451, to detect the rhythm of wearable ornament 120, which is presumed to be the same as the rhythm of the user who wears wearable ornament 120, such as when dancing, and if the rhythm is found consistent, then in step 455, the rhythm of the video exhibited by wearable ornament 120 is adapted to the rhythm of the wearable ornament 120. In some embodiments, the changing rhythm may be reported to mobile device 150, to affect automatic selection of a visual that matches the current rhythm according to a lookup table. In some embodiments, an accelerometer built into mobile device 150 (not shown) may undertake the roles of accelerometer 130C described above, under the assumption that the current motion of mobile device 150 is similar the current motion of wearable ornament 120.

Figure 11:
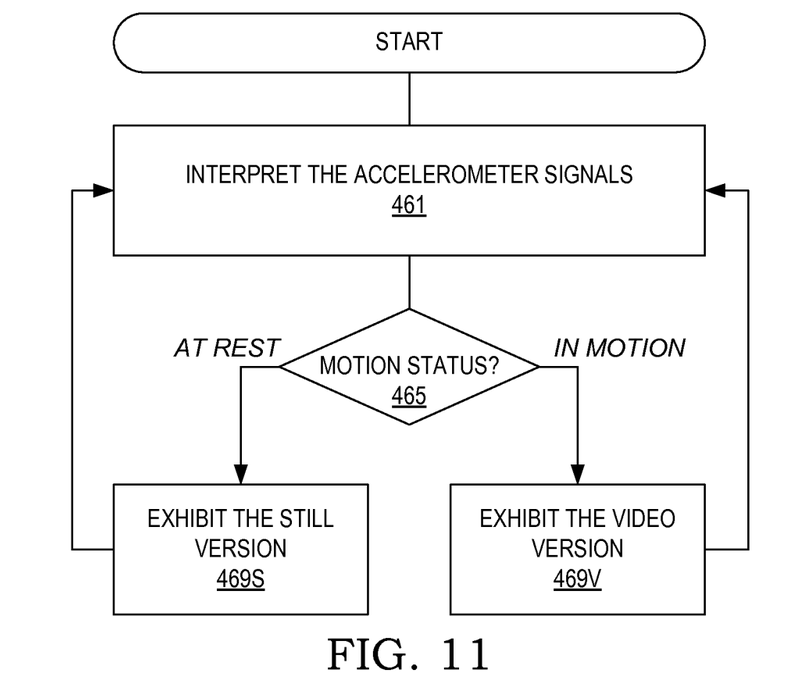
FIG. 11 is a flowchart that describes an optional mode of operation.

FIG. 11 describes how accelerometer 130C can be applied for saving power. Presuming that if the wearable ornament 120 is kept at absolute rest for a predetermined period of time, say 5 minutes, then it can be presumed not to be worn, and can display a still version instead of a video version, or even having the display turned-off after another period of rest. For the following discussion, the current visual 190 is presumed to have both a still image 190S version and a video track 190V version (FIG. 4). Thus, in step 461, processor 130A interprets signals received from accelerometer 130C to detect motion. If no signals have been received for a predefined period of time, such as 5 minutes, then step 465 decides "AT REST" status, which branches to exhibiting in step 469S the still version of the current visual 190, with the goal of saving power. If motion is detected, then step 465 branches toward exhibiting the video version in step 469V. Step 461 remains further active, to switch from video to still and back, as needed.

Figure 12:
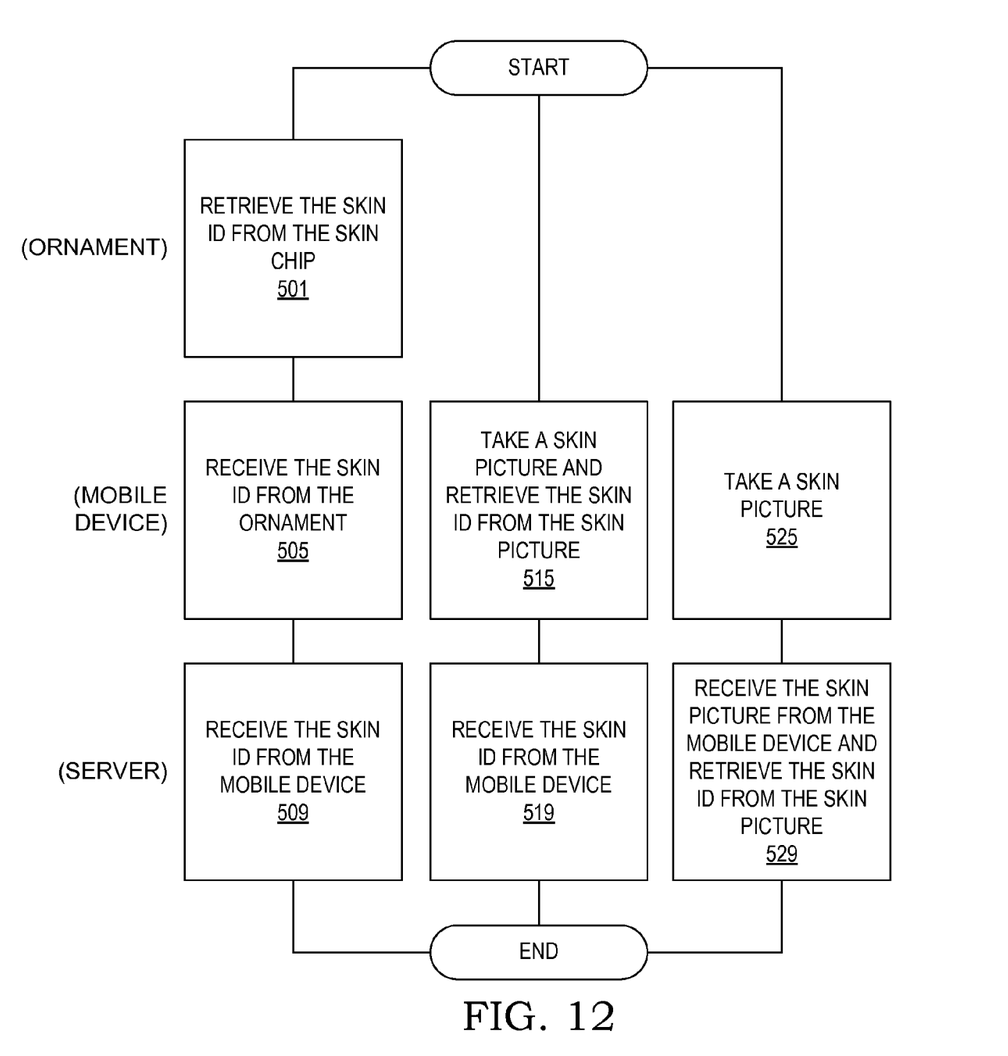
FIG. 12 is a flowchart that describes an optional mode of operation.

FIG. 12 describes in more detail an alternative method for identifying the current skin 140 attached to main unit 124, as briefly introduced in step 301 of FIG. 6 and step 331 of FIG. 7. Three methods are covered by the three columns, while the rows represent actions taken in wearable ornament 120, mobile device 150 and server 170, respectively. A first method starts in step 501, where processor 130A of wearable ornament 120 retrieves from skin chip 146 of skin 140 its skin identifier 146A. In step 505 the skin identifier is received by mobile device 150 from wearable ornament 120, and in step 509 the skin identifier is received by server 170 from mobile device 150. According to a second method, in step 515, a picture of the skin is taken by camera 164 of mobile device 150, and image processing in combination with a skin image database hosted in the memory of mobile device 150 (not shown in FIG. 3) are used to retrieve the skin identifier from the skin picture. The skin identifier is then received, in step 519, by server 170 from mobile device 150. Under a third method, in step 525, a picture of the skin is taken by camera 164 of mobile device 150, and in step 529, the skin picture is received by server 170 from mobile device 150, where image processing and server store 180 are used to retrieve the skin identifier.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A method, executed by at least one processor, for matching, on a wearable ornament, a logically-changeable visual with a physically-changeable skin, the method comprising:
   identifying a current skin that is currently attached to the wearable ornament;
   sending to a store of visuals, that is hosted on a remote server, an identifier of the current skin;
   retrieving a selected visual in response to the identifier of the current skin, the selected visual including a still version and a video version;
   providing the selected visual for exhibition on a display of the wearable ornament;
   detecting whether the wearable ornament is in motion or at rest;
   if the wearable ornament is in motion, then exhibiting the video version; and
   if the wearable ornament is at rest, then exhibiting the still version.

2. The method of claim 1, wherein said retrieving comprises:
   receiving, from the store of visuals, a plurality of visuals chosen by the server, in response to the identifier of the current skin, to match the current skin; and
   getting a user input that selects the selected visual from the plurality of the received visuals.

3. The method of claim 1, wherein said retrieving comprises:
   receiving, from the store, a single visual chosen by the store, in response to the identifier of the current skin, to match the current skin.

4. The method of claim 3, wherein:
   the single visual received from the store, for same identifier, is changing in a subsequent retrieving.

5. The method of claim 1, wherein the selected visual includes a video track and an audio track, the method further comprising: exhibiting the video track on the wearable ornament, synchronously with playing the audio track on a mobile device that communicates with the wearable ornament that exhibits the video.

6. A system comprising:
   a wearable ornament, comprising:
     a main unit that includes a display for exhibiting visuals, and
     a changeable current skin attached to the main unit; and
   a mobile device selectably communicating with the wearable ornament, the mobile device is configured to:
     identify to a remote server the current skin attached to the main unit,
     retrieve a selected visual that matches the current skin, the selected visual including a still version and a video version,
     provide the selected visual to the main unit of the wearable ornament for exhibition on the display of the main unit;
     detect whether the wearable ornament is in motion or at rest;

if the wearable ornament is in motion, then exhibit the video version; and if the wearable ornament is at rest, then exhibit the still version.

7. The system of claim 6, wherein the mobile device is operable to retrieve the selected visual by being configured to:

receive, from the server, a plurality of visuals chosen by the server to match the current skin; and getting a user input that selects the selected visual from the plurality of the received visuals.

8. The system of claim 6, wherein the mobile device is operable to retrieve the selected visual by being configured to receive, from the server, a single visual chosen by the server to match the current skin.

9. The system of claim 8, wherein the single visual received from the store, for same current skin, changes in a subsequent retrieve operation.

10. The system of claim 6, wherein the selected visual includes a video track and an audio track, the system is further operative to play the audio track on the mobile device synchronously with exhibiting the video track on the wearable ornament.

* * * * *